US008385723B2

(12) United States Patent
McClanahan et al.

(10) Patent No.: US 8,385,723 B2
(45) Date of Patent: Feb. 26, 2013

(54) RECORDING OF SPORTS RELATED TELEVISION PROGRAMMING

(75) Inventors: Joseph McClanahan, Redmond, WA (US); Cory Cirrincione, Bellevue, WA (US); Todd San Jule, Woodinville, WA (US); Mark Schwesinger, Bellevue, WA (US); Sean Kollenkark, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 12/818,622

(22) Filed: Jun. 18, 2010

(65) Prior Publication Data

US 2011/0311205 A1    Dec. 22, 2011

(51) Int. Cl.
   *H04N 5/91* (2006.01)
   *G06F 17/30* (2006.01)
(52) U.S. Cl. .................. 386/296; 386/83; 386/292
(58) Field of Classification Search .............. None
   See application file for complete search history.

(56) References Cited

U.S. PATENT DOCUMENTS

| | | | | |
|---|---|---|---|---|
| 5,729,471 A * | 3/1998 | Jain et al. | ...... | 725/131 |
| 6,144,375 A * | 11/2000 | Jain et al. | ...... | 715/251 |
| 6,810,397 B1 * | 10/2004 | Qian et al. | ...... | 707/794 |
| 7,424,535 B2 * | 9/2008 | Karaoguz et al. | ...... | 709/226 |
| 7,543,322 B1 | 6/2009 | Bhogal | | |
| 8,060,534 B1 * | 11/2011 | Ansari et al. | ...... | 707/794 |
| 8,073,851 B2 * | 12/2011 | Takata et al. | ...... | 707/739 |
| 8,111,972 B2 * | 2/2012 | Taguchi et al. | ...... | 386/291 |
| 8,135,262 B2 * | 3/2012 | Kusunoki et al. | ...... | 386/291 |
| 8,165,519 B2 * | 4/2012 | Sato et al. | ...... | 455/3.01 |
| 8,181,205 B2 * | 5/2012 | Russ et al. | ...... | 725/58 |
| 2002/0157101 A1 | 10/2002 | Schrader | | |
| 2002/0166123 A1 | 11/2002 | Schrader | | |
| 2003/0005453 A1 * | 1/2003 | Rodriguez et al. | ...... | 725/87 |
| 2003/0208767 A1 * | 11/2003 | Williamson et al. | ...... | 725/93 |

(Continued)

OTHER PUBLICATIONS

Chang et al, "A Fully Automated Content-Based Video SEarch Engine Supporting Spatiotemporal Queries", IEEE Transcations on Circuits and Systems for Video Technology, vol. 8, No. 5, Sep. 1998, pp. 602-615.*

(Continued)

*Primary Examiner* — Gims Philippe
*Assistant Examiner* — Reza Aghevli
(74) *Attorney, Agent, or Firm* — Microsoft Corporation

(57) ABSTRACT

A video recording system that controls recording of television programming relating to sporting events to better match the intent of a user who specified programming for recording. The system merges data from an electronic program guide and sports data, such as from a news feed, to determine values of recording parameters, such as start and stop time and channel. User input may specify a player, team, league or other sports entity for which sporting events are to be recorded. The system may use the sports data to identify sporting events involving the specified sports entity and then access an electronic program guide to determine a channel on which to record the sporting events. When the user specifies a sporting event to record, sports data may be used to track progress of the event and dynamically adjust an ending time of the recording to ensure that the full event is recorded.

20 Claims, 10 Drawing Sheets

U.S. PATENT DOCUMENTS

| | | | |
|---|---|---|---|
| 2006/0051059 A1 | 3/2006 | Krakirian | |
| 2008/0229373 A1* | 9/2008 | Ma et al. | 725/92 |
| 2008/0307485 A1 | 12/2008 | Clement | |
| 2009/0148124 A1 | 6/2009 | Athsani | |
| 2009/0183212 A1* | 7/2009 | Sincaglia et al. | 725/92 |
| 2009/0257732 A1* | 10/2009 | Callaway et al. | 386/83 |
| 2010/0040345 A1* | 2/2010 | Beach et al. | 386/83 |
| 2010/0095322 A1* | 4/2010 | Gordon et al. | 725/30 |

OTHER PUBLICATIONS

SageTV Add-In Feature: #1 Sage Recording Extender—Published Date: Feb. 21, 2010 http://homeservershow.com/sagetv-add-in-feature-1-sage-recording-extender.html.

Myth Recording Extender (MRE) v1.0.0 Released—Published Date: Aug. 13, 2006 http://www.gossamer-threads.com/lists/mythtv/users/217986.

Yevgeniy Miretskiy et al., "Avfs: An On-Access Anti-virus File System" *Stony Brook University, 13$^{th}$ USENIX Security Symposium*, 2004, pp. 1-16.

William Yurcik et al., "A Survivability-Over-Security (SOS) Approach to Holistic Cyber-Ecosystem Assurance", *IEEE*, 2002, 8 pgs.

* cited by examiner

| 5/29 | | 5:00pm | 5:30pm | 6:00pm | GUIDE |
|---|---|---|---|---|---|
| 2 | NWCN | Northwest Week | NW Backroads | Gardening With | |
| 3 | KWPXDT | The Godfather, Part II | | | |
| 4 | KOMO | KOMO 4 News | ABC World News | KOMO 4 News | |
| 5 | KING | NHL HOCKEY | | 530 > | |
| 6 | KONG | The Tim McCarver Show | Sounders FC Pre | MLS Soccer | |
| 7 | KIRO | KIRO 7 Eyewitness | CBS Evening News | KIRO 7 Eyewitness News at 6PM | |
| 8 | DSCP | Deadliest Catch | | Deadliest Catch | |

— 510

— 520

— 540

NHL HOCKEY
Philadelphia Flyers at Chicago Blackhawks
Stanley Cup Finals, Game 1. from the United Center in Chicago
5:00 to 8:00 pm 5/29   CH 5 KING

FIG. 5

RECORDING OF SPORTS RELATED TELEVISION PROGRAMMING

BACKGROUND

In home entertainment systems, it is known to include a device, sometimes called a Digital Video Recorder (DVR) or Personal Video Recorder (PVR), to allow home television subscribers to record television programming for viewing at a time that is more convenient for the subscriber. To support this function, a DVR may present a user interface through which a user may enter recording requests for one or more programs. The device may maintain a list of such requests and, at an appropriate time, record television information.

Conventional DVR's support multiple formats by which a user may enter a request for recording. A user may enter a date, time, duration and channel for recording. At the specified time, the DVR may control a tuner to tune to the specified channel and record television information for the indicated duration.

Alternatively, a DVR may have access to an Electronic Program Guide (EPG). The EPG may indicate the time and channel during which programs are presented by television service providers. The DVR may use the EPG to offer a menu of recording options, allowing a user to input a recording request by identifying a program by name. The DVR may then relate the program name to a date, time, duration and channel for recording.

Use of an EPG to relate a program name to a specific date, time, duration and channel also supports requests specified in other ways. A user, for example, may specify recording a series of programs. The DVR can access the EPG to find each instance of that program that is scheduled. Also, use of the EPG may allow the DVR to accept a keyword from the user and identify programs described in the EPG by the specified keyword.

SUMMARY

A user experience in viewing recorded television programming may be enhanced by synthesizing program guide data with sports data. By synthesizing this information, a recording system may better identify programming that corresponds to a users' intent when requesting programming to be recorded.

The sports data may identify sports entities, such as leagues, teams or individual players, in a way that allows the sports entities to be associated with sporting events that appear in a program guide. A user may specify a sports entity and the system may then identify and record one or more sporting events involving the specified entity. Additionally, the sports data may be used to dynamically determine values of recording parameters, even if those recording parameters are different than recording parameters determined selected from the program guide. The sports data, for example, may include a data feed that reveals a status of a sporting event being recorded. When the status indicates that the sporting event has a different end time than is in the program guide, the sports data may override values of recording parameters selected based on the guide data.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 is a sketch graphical user interface of a system that may present and/or record television programming;

DETAILED DESCRIPTION

Figure 1:
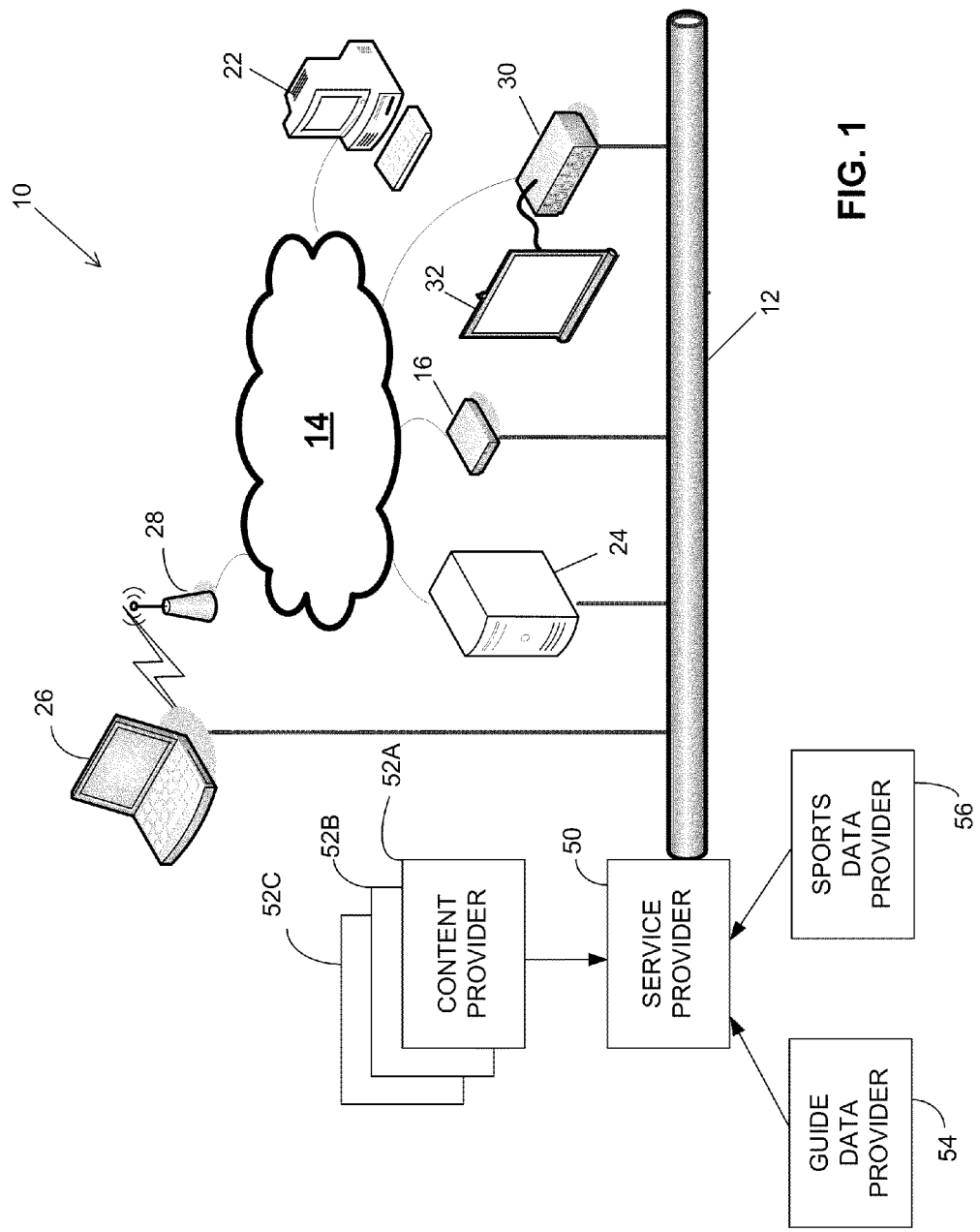
FIG. 1 is a sketch of an exemplary environment in which embodiment of the inventions may operate.

The inventors have recognized and appreciated that current approaches by which DVR's provide options for users to specify television programming for recording may not result in television programming being recorded in accordance with the user's intent. The inventors has further recognized and appreciated that requests to record sporting events are particularly susceptible to such a failure to record television programming according to a user's intent because of the dynamic nature of sporting events and because of a mismatch between the way sports enthusiasts think of sporting events and the manner in which sporting events are represented in a television program guide.

Sporting events, for example, may be scheduled or rescheduled based on factors that change after a program guide is generated and distributed. Rain delays can change the time at which sporting events are presented on television such that the sporting event is presented after a time indicated in a program guide. Even when the time of a sporting event is set in advance, the teams that participate in the sporting event may be determined based on the outcome of other sporting events such that the program guide is issued without an indication of the teams to compete in an event. Further, the specific players that appear in a sporting event can change based on health of the players and coaching decisions.

Moreover, sporting events may sometimes be of unpredictable duration. A baseball game may require more than a regulation nine innings. A football game may go into overtime or a soccer game may include a substantial amount of stoppage time, for example. If a recording session, intended to capture a sporting event, is scheduled based on guide data, the recording may end before the sporting event if an unscheduled situation causes the sporting event to extend beyond its scheduled ending time.

Accordingly, in some aspects, a DVR may have access to a source of sports data. The DVR may merge the sports data and EPG to determine values for recording parameters that complies with a user request. The sports data may allow the DVR to match a user request for recording television programming related to a sports entity to values of recording parameters, such as a date, time, duration and channel for recording. The sports entity may be specified, for example, as a league, a team or a player, and the DVR may use the sports data to identify programming involving that entity.

The source of sports data may include a live feed with information about upcoming or on-going sporting events. Information in the feed may reveal status of the sporting event, and may be used to override a recording time determined based on the EPG. The status, for example, may be used to determine an end time for a recording session intended to capture the sporting event. Alternatively or additionally, the status information may be used to determine the start time for recording, and may even be used to determine whether to initiate recording.

Merging of sports data and guide data to control recording of television programming may be performed in any suitable system. It should be appreciated that a system for recording sports related television programming may be implemented as a stand-alone device. Though, it should also be recognized that a DVR may be implemented as a group of devices that are interconnected by a network and that each performs some or all of the functions of a stand alone device. For example, a tuner may be installed in one device and a user interface, through which a user may input requests for recording sports programming, may be implemented in another device, such that these devices collectively implement the functions of a DVR.

The devices in the group may be of any suitable type or types. These devices may be interconnected in any suitable way. Though, in some embodiments, the devices that form a group may be interconnected over a home network and may be computerized devices of the type that conventionally may be used within a home, programmed to perform the functions described herein. The devices, for example, may include personal computers, such as desk top computers and laptop computers, or set-top boxes, such as cable boxes. Alternatively or additionally, such devices may be located "in the cloud." Though, the specific devices used and the manner in which they are interconnected is not critical to the invention.

FIG. 1 illustrates an exemplary embodiment of a system 10 in which sports-related television programming may be recorded. System 10 includes interfaces to one or more media over which television programming may be obtained. In the example of FIG. 1, that media is illustrated by cable 12. Cable 12 may be a cable as is known in the art connecting a home, office or other facility to a service provider 50. Cable 12 may carry electrical signals from a service provider to a premises containing system 10. Alternatively, cable 12 may be a fiber optic cable, carrying signals representing television programming in optical form. Though, it should be recognized that the nature of the signals carried on cable 12 is not critical to the invention.

Regardless of the specific media used, service provider 50 may provide one or more types of information over that media. In this example, the information provided includes television programming. As shown, service provider 50 has connections to multiple content providers, such as content providers 52A, 52B and 52C. Such content providers may be networks that supply television programming. Though, it should be appreciated that the specific nature of content providers 52A, 52B and 52C is not critical to the invention.

Moreover, the specific media used to access television programming is not critical to the invention. It is known, for example, to access television programming from satellite or other wireless communications or even over the Internet. System 10 may include one or more devices that have tuners capable of accessing television programming over one or more of these media or other suitable media.

Regardless of the specific media used to access television programming, the signals representing television programming on each media may be generated by a service provider, such as service provider 50. The service provider may provide multiple channels of television programming, all of which may be communicated over the media. As a specific example, cable 12 may carry electrical signals representing hundreds of channels of television programming.

One or more of the computerized devices within system 10 may be configured to access television programming over a medium used by service provider 50. Computerized devices may be adapted to access television programming by including a hardware component, called a "tuner." The tuner may be coupled to the media—cable 12 in the example of FIG. 1—and receive signals carrying television programming from that media. The tuner may be controlled, such as by commands sent from a processor in the computerized device, to select a specific channel on the media. The signals carrying television programming on that channel may then be decoded by the tuner and presented in a format that may be manipulated by a computerized device. Such tuners are known in the art, and any suitable tuner or tuners may be used in system 10.

In the embodiment of FIG. 1, multiple computerized devices connected to cable 12 are illustrated. As one example, digital video recorder 30 is shown coupled to cable 12. Digital video recorder 30 may be programmed such that a tuner within digital video recorder 30 accesses signals in specific channels carried on cable 12 at programmed times. That programming may be controlled by a processor within digital video recorder 30 or from within any other device in the group. Regardless of how it is programmed, the tuner within digital video recorder 30 may decode the signals on a channel to which it is tuned and output television program conveyed by that signal in digital form. A processor within digital video recorder 30 may manipulate that data by storing it on a disk or other storage media and presenting it on a television 32 in response to a user input at a later time.

Digital video recorder 30 is an example of a computerized device sometimes called a set top box because of a conventional association between such a computerized device and a television set through which content captured by the device is displayed to a user. Though, it is not a requirement that a tuner be within a computerized device dedicated for use in recording television programming. Tuners may be contained in other types of computerized devices, including general purpose computers such as desk top computers and lap top computers. In the example of FIG. 1, a general purpose computer 24 is illustrated coupled to cable 12. General purpose computer 24 may include a tuner that similarly can be controlled to select signals on a channel on cable 12 and provide them to a processor for manipulation in digital form. Lap top computer 26 may also be configured with a tuner to access television programming carried on cable 12.

In system 10, the computerized devices that can access television programming over cable 12 are also interconnected via network 14. Network 14 may be a computer network as is known in the art. In the example in which system 10 is deployed within a user's home or other premises, network 14 may be a home network or other suitable type of local area network (LAN). However, the specific type of network 14 is not critical to the invention, and any suitable network may be used to allow communication among computerized devices of system 10.

In the example of FIG. 1, a connection is provided between cable 12 and network 14 through internet gateway device 16. Such a device may be used when cable 12 conveys information in addition to television programming. Some service providers also provide high speed Internet access using the same media used to convey signals carrying television programming. In such a scenario, the connection between network 14 and cable 12 allows computerized devices coupled to network 14 to access that high speed Internet service over cable 12. Though, it is not a requirement that system 10 provide Internet service over the same media used to provide television service. It is also not a requirement that system 10 include Internet service at all. However an Internet connection is an example of another media over which a device could access television programming.

In scenarios in which television programming is accessible over the Internet, one or more of the computerized devices coupled to network 14 may also access television programming available over the Internet. As a specific example, computer 22 is shown coupled to network 14, but not directly to cable 12. Though computer 22 may not include a cable tuner capable of decoding signals representing television programming communicated on cable 12, computer 22 may nonetheless include components serving as a "tuner" for accessing television programming available over the Internet.

FIG. 1 illustrates that computerized devices may be connected together, and such a connection may be made in any suitable way, including using wired or wireless connections. The example of FIG. 1 shows that digital video recorder 30 and computer 24 are wired to network 14. Though, devices need not be wired to be part of the group. Network 14, for example, may include a wireless access point 28 or other mechanism to support wireless connections. In the example of FIG. 1, computer 26 may access network 14 through wireless access point 28. Thus, the invention is not limited to any specific type of connection to network 14.

To facilitate recording of sporting events in a manner that more nearly aligns with a user's intent, service provider 50 may also supply one or more other types of digital data over cable 12 that can be used in selecting programming to record. In the example illustrated, those other types of digital data include guide data and sports data. That data may come from any suitable source, indicated in FIG. 1 as guide data provider 54 and sports data provider 56. The specific mechanism by which such data is made available to devices within system 10 is not critical to the invention. Service provider 50 may have an arrangement directly with guide data provider 54 and sports data provider 56 such that guide data and sports are integrated with services provided by service provider 50. As a specific example, service provider 50 may have an agreement with guide data provider under which it broadcasts the data as a video image on a television channel dedicated for this purpose. Though, in other embodiments, service provider 50 may also serve as an Internet service provider and one or more devices of system 10 may access guide data provider 54 and/or sports data provider 56 directly over the Internet.

Guide data provider 54 may be any suitable provider of television guide data. Commercial guide data providers exist and system 10 may operate with guide data from such providers. System 10 may be adapted to use such guide data as it currently exists. Though, in some embodiments, guide data may be tagged or otherwise formatted for use by system 10.

Sports data provider 56 may be any suitable provider of sports data. Commercial sports data providers also exist. News outlets, particularly those that focus on sports news, may broadcast or stream data about sports entities and sporting events and may therefore serve as sports data providers. System 10 may be adapted to use such sports data. Though, embodiments are also possible in which sports data is tagged or otherwise specifically formatted for use by system 10. As an example, sports data may include tags to indicate that certain data items represent scores of sporting events, time remaining in a sporting event or other information specifically about a sporting event. Therefore, it should be appreciated that the specific source of sports data is not a limitation on the invention.

Figure 2:
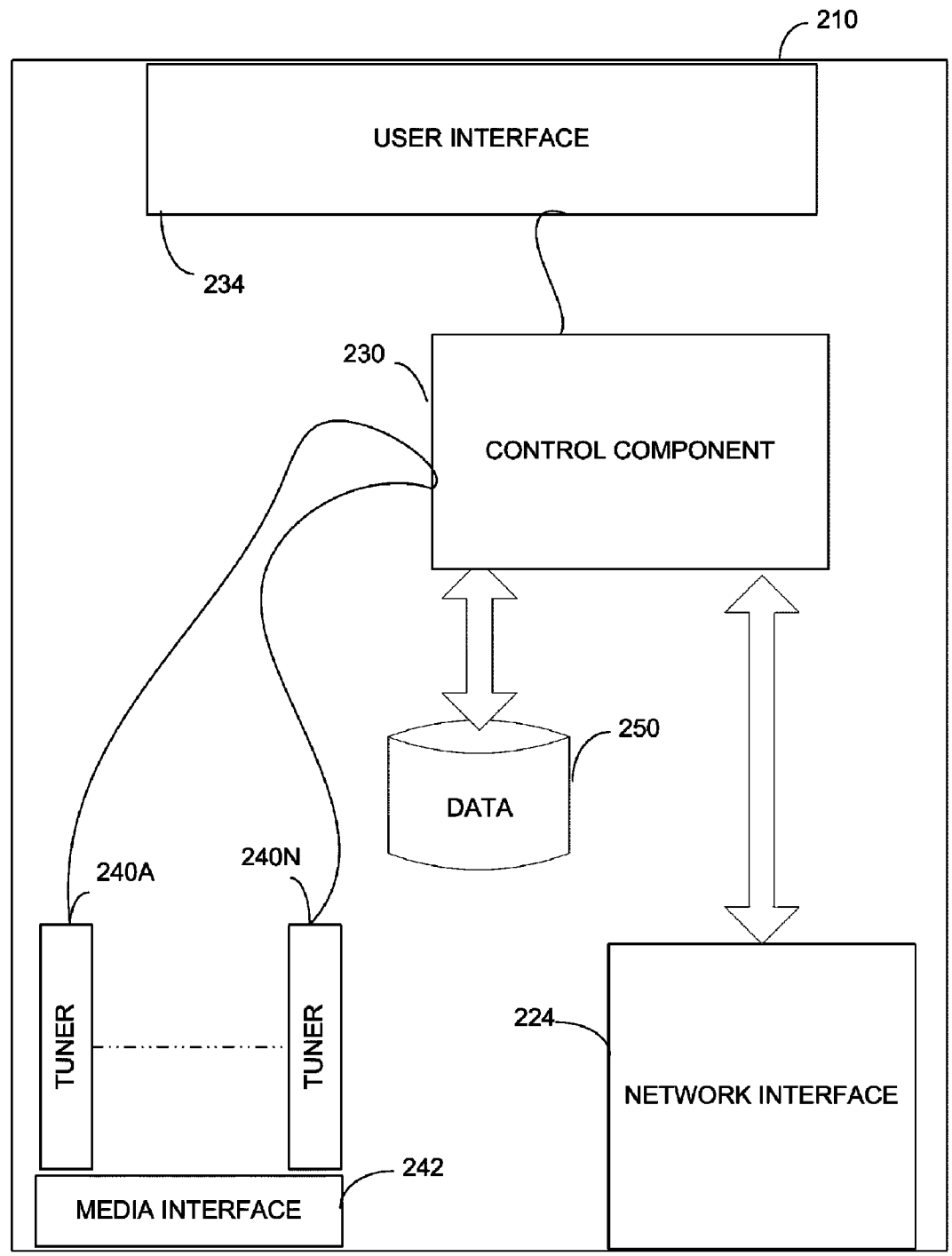
FIG. 2 is an architectural block diagram of a representative computerized device in the system of FIG. 1.

Turning to FIG. 2 an architecture of an exemplary device that may exist in system 10 is illustrated. Device 210 may be a computerized device, such as computer 22 (FIG. 1) or digital video recorder 30. Though, it should be appreciated, that the components of device 210 need not be packaged in a single housing such that device 210 may represent components distributed across multiple separate units, possibly connected over a network, as illustrated in FIG. 1.

In this example, device 210 includes multiple tuners 240A . . . 240N. Each of the tuners is connected to media that may provide signals representing television programming to device 210. Those connections may be made through media interface 242. The nature of media interface 242 and tuners 240A . . . 240N may depend on the nature of the media to which device 210 is connected. In the example of FIG. 1 in which a device such as computer 24 or digital video recorder 30 is coupled to a cable 12, media interface 242 may be an interface to a cable and tuners 240A . . . 240N may be tuners adapted to decode television programming transmitted over a cable. Such components are known in the art, and device 210 may contain conventional components or any other suitable components that can be controlled to obtain information representing television programming over any suitable media.

Tuners 240A . . . 240N may be controlled by a control component 230. Control component 230 may be implemented using techniques as are known in the art for controlling electronic devices. As one example, control component 230 may be one or more processors, whether general purpose or special purpose processors, configured to control device 210. The control component 230 may control device 210 to perform functions associated with recording sporting events and to otherwise control device 210 to interact with one or more users to record and display television programming.

Control component 230 may interface to a data store 250. Data store 250 may be implemented as computer-readable storage media of any suitable type. Though shown as a single data store within device 210, data store 250 may be implemented on multiple devices or as multiple memory components on device 210. Moreover, data store 250 may be implemented with physical memory resident on device 210 or any one or more other devices that control component 230 may access. Accordingly, it should be appreciated that the specific implementation of data store 250 is not critical to the invention.

However implemented, data store 250 may contain multiple types of information. For example, data store 250 may contain recorded television programming, which may be presented at any time after it is recorded to a user of device 210. The recorded television programming may be presented through user interface 234 or in any other suitable way in response to user input.

Additionally, data store 250 may store recording parameters, indicating television programming to be recorded by device 210. In operation, control component 230 may access the recording parameters stored in data store 250 to determine when television programming is to be recorded. At a time when the recording parameters indicate that television programming is to be recorded, control component 230 may generate signals to control one or more the tuners 240A ... 240N to record that television programming. Recording may involve capturing the output of the tuner and storing it as recorded television programming within data store 250.

Additionally, data store 250 may contain information to enable control component 230 to identify television programming related to a sporting event that a user has indicated a desire to record. That information may include sports data and guide data. Such information may be used to generate user interfaces, offering a user options for specifying commands that can be identified as relating to sporting events to be recorded. Such information can also be used for interpreting user inputs and for generating appropriate values for recording parameters based on those inputs.

The information in data store 250 may be obtained in any suitable way. Recording parameters, for example, may be provided by a user through user interface 234 or generated from inputs provided by a user. Though, in other embodiments, recording parameters may alternatively or additionally be supplied from another device within system 10. In those embodiments, the recording parameters may be passed over a network, such as network 14 (FIG. 1) and received through network interface 224 or otherwise conveyed to device 210.

Likewise, guide data and sports data may be obtained through user interface 234 or from any other suitable source, including through network interface 224. In the embodiment illustrated in FIG. 1, guide data and sports data may be provided by service provider 50 as high speed digital data that is coupled through gateway device 16 onto network 14. Though, other techniques for obtaining guide data or sports data may be employed. For example, control component 230 may analyze the content of information communicated as television programming on a guide channel that is decoded by one of the tuners 240A ... 240N. Accordingly, it should be appreciated that the mechanism by which guide data and/or sports data is obtained is not critical to the invention.

User interface 234 also may be implemented using techniques as are known in the art. For example, user interface 234 may include an output device, such as a display. The display may be integrated with device 210 or may be a separate device, such as a television, to which device 210 is coupled. The user interface 234 may include one or more input devices such that a user may input indications of television programming the user desires to have recorded. Any suitable input device may be used, including computer peripherals conventionally used as input devices. As another example of a suitable input device, user interface 234 may respond to input from a remote control of the type conventionally used with a television, digital video recorded or other home electronic device.

Regardless of the specific components used to implement user interface 234, the information presented on user interface 234 and the controls available to a user as part of user interface 234 may allow a user to specify television programming to be recorded in a manner that is likely to result in recording of sporting events of interest to the user. Such interfaces may be generated by control component 230 by combining guide data and sports data. Exemplary interfaces are described in greater detail below.

Figure 3:
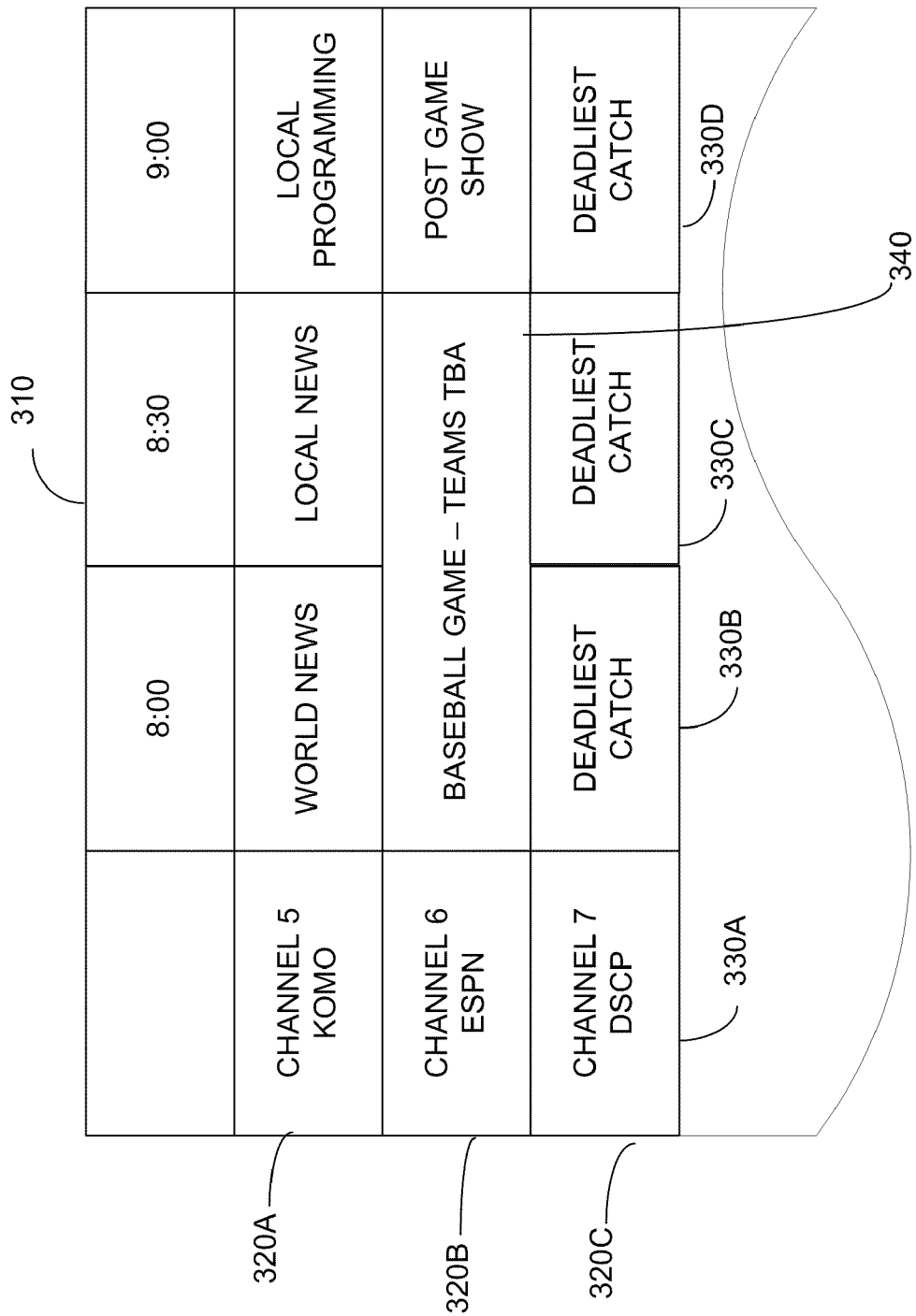
FIG. 3 is a schematic illustration of guide data according to some embodiments.
Figure 4A:
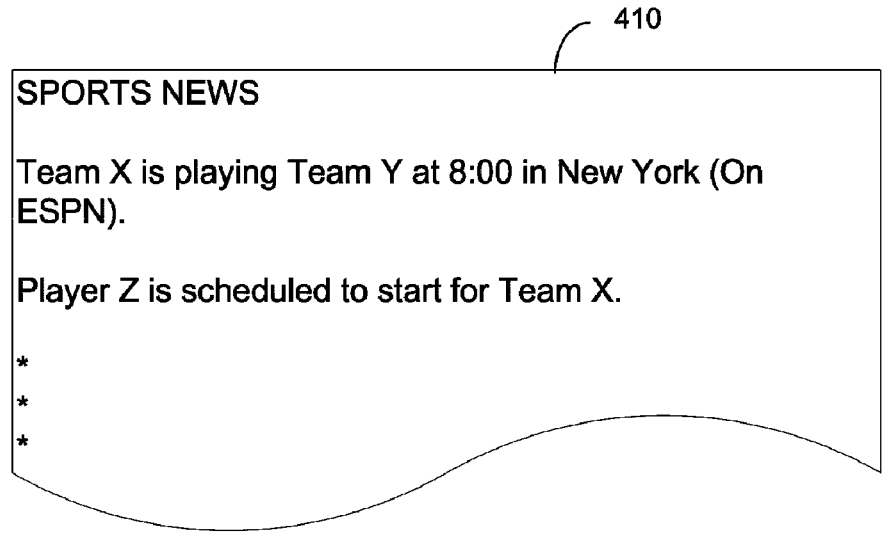
FIGS. 4A and 4B are schematic representations of sports data according to some embodiments.
Figure 4B:
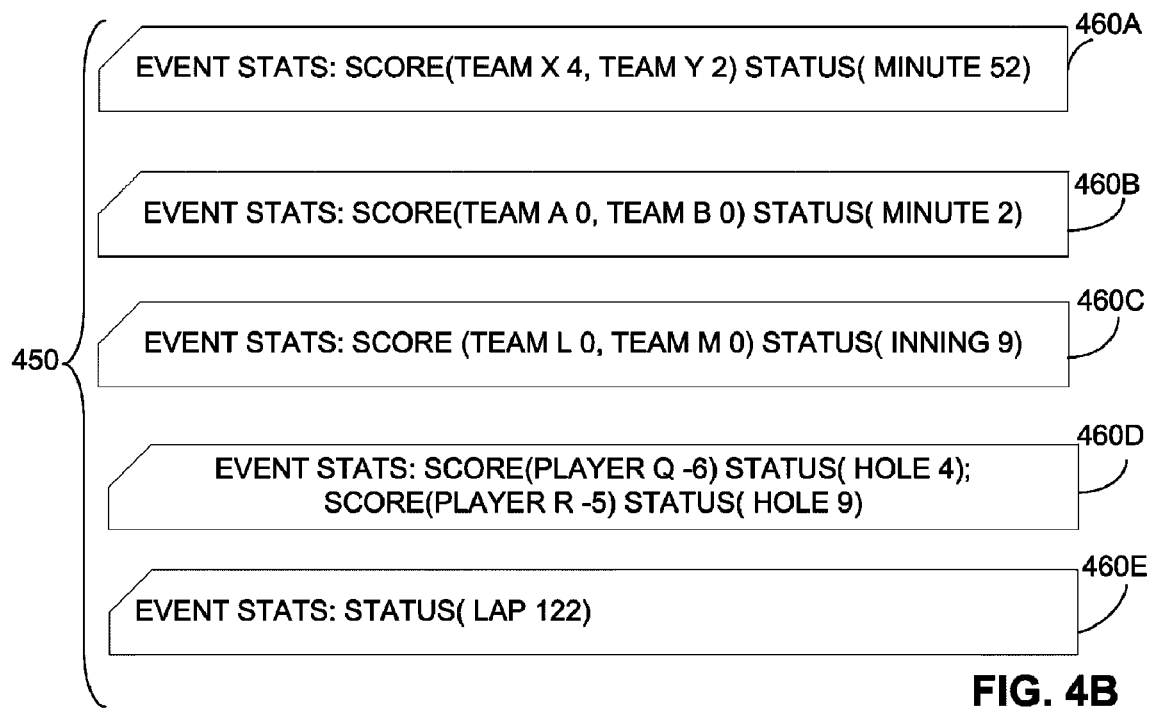

Turning to FIG. 3 and FIGS. 4A and 4B, illustrative embodiments of guide data and sports data are provided. This information reveals ways in which guide data and sports data may be used together to determine recording parameters that result in recording of television programming that aligns with a user's intent. These figures illustrate the types of guide data and sports data that may be used to determine values for recording parameters, such as values for parameters that indicate what television programming to record, when to record it or how long to record it.

FIG. 3 illustrates in schematic form guide data that may be used by control component 230. In some embodiments, this data is used both in generating graphical user interfaces for display through user interface 234 and for processing commands received through user interface 234 to identify television programming that, if recorded, aligns with the intent of the user as expressed by input provided through user interface 234.

In the illustrated example, guide data 310 is organized in a two-dimensional matrix containing rows 320A, 320B and 320C and columns 330A, 330B, 330C and 330D. In this example, each row is associated with a content provider, such as content providers 52A, 52B and 52C. Though, television programming from three content providers is illustrated, it should be appreciated that a television service provider may provide television programming from more than three content providers. Here, three content providers are illustrated for simplicity.

Each column in guide data 310 indicates television programming provided by the content providers during a specific time slot. In the example of FIG. 3, time slots corresponding to 8:00, 8:30 and 9:00 are illustrated in rows 330B, 330C and 330D, respectively. Though three time slots are illustrated, it should be appreciated that television programming is generated in more than three time slots. Three time slots are illustrated for simplicity.

In the example, of FIG. 3, column 330A indicates a content provider providing the television programming identified in each row. In addition, column 330A includes, for each content provider, a channel on which television programming from that content provider may be accessed. The channel on which television programming may be accessed may vary from service provider to service provider. Accordingly, it is known in the art of operating television recording devices to use a channel line up to determine for each service provider the channels on which television programming from different content providers may be accessed. Accordingly, guide data 310 may represent guide data that has been fused with a channel line up such that both a channel and content provider are indicated.

FIG. 3 illustrates a scenario in which conventional programming techniques specifying television programming to record based on time and channel may not achieve a user's intent. In this example, guide data 310 indicates in block 340 that a baseball game is to be displayed in the time slots for 8:00 and 8:30. The time of the baseball game can be determined based on information in columns 330B and 330C. Based on information in row 320B, it may also be determined from guide data 310 that the baseball game is being provided by a content provider designated as ESPN. Further, it can be determined that the baseball game can be recorded on channel 6. However, in this example, guide data 310 has been obtained by a device, such as device 210, at a time when guide data 310 does not identify the teams playing in the baseball game to be presented on ESPN at 8:00.

In accordance with some embodiments of a digital recording system as described herein, guide data may be fused with sports data to allow control component 230 to determine the teams playing in the indicated game. That information may be used to determine whether the television programming to be presented on ESPN will show a sporting event involving teams of interest to a user who programmed a request to record sporting events by identifying teams of interest to the user. FIGS. 4A and 4B illustrate examples of sports data that may be used, possibly in combination with guide data 310, to allow control component 230 (FIG. 2) to interact with a user to identify programming to record in accordance with the user's intent as reflected by input provided through user interface 234.

Sports data 410 may include information in the form of sports news reports. This information may allow control component 230 to associate sporting events with sports entities. The sports entity, for example, may be a league, a team or a player. Further, the sporting event may be associated with a content provider or other index also present in the guide data such that control component 230 may identify, based on guide data 310, appropriate recording parameters to record one or more sporting events involving a sports entity identified by a user.

In this specific example of FIG. 4A, sports data 410 is in the form of a sports news report, such as may be issued by a news outlet specializing in sports news. In this example, report 410 includes information indicating that two teams, team X and team Y, are playing in a sporting event. Report 410 indicates the time of the event as 8:00. Further, the report indicates a content provider presenting that sporting event. In this case, the content provider is indicated as ESPN. In this example, information identifying a network that plans to present a sporting event can serve as an index that allows sports data and guide data to be fused. Though, it should be appreciated that any suitable index may be used.

As can be seen from the simplified example of FIGS. 3 and 4A, guide data 310 in combination with sports data, such as report 410, allows control component 230 to identify that a sporting event involving team X and team Y can be recorded on a channel 6 from 8:00 to 9:00. Accordingly, user input specifying that device 210 should record sporting events relating to a sports entity, such as team X or team Y, may result in device 210 appropriately determining that an event involving the designated sports entity may be recorded on channel 6 starting at 8:00.

Other information within report 410 allows control component 230 to identify sporting events involving other sports entities for which a user has indicated a desire to record television programming. In this example, report 410 includes information about a sports entity that is a player, player Z. Report 410 indicates that player Z is scheduled to start for team X. Accordingly, if a user has input information indicating a desire for device 210 to record television programming presenting sporting events involving player Z, control component can determine, based on the information in report 410, in combination with the guide data 310, that television programming presented on channel 6 at 8:00 should be recorded.

Thus, as can seen by the example of FIG. 4A, sports data may be used to relate specific sports entities to specific sporting events. With this information, control component 230 may use guide data and sports data to identify television programming involving a designated sports entity that a user has identified as an entity about for which sporting events should be recorded. Based on this recognition, control component 230 may identify appropriate recording parameters.

The sports data used to determine appropriate values for recording parameters may be in any suitable format. In the example of FIG. 4A, report 410 is depicted as plain text. In this scenario, control component 230 may determine information relating to a sports entity to a sporting event by parsing the plain text in report 410 using natural language processing techniques or other similar approaches. In other embodiments, processing by control component 230 may be simplified by formatting sports data with tags to indicate sports entities, sporting events or other information relevant to determination of values of recording parameters for sporting events.

FIG. 4B illustrates another type of sports data that may be used instead of or in addition to reports in the form of report 410. FIG. 4B illustrates a stream 450 of reports 460A, 460B, 460C, 460D and 460E such as may exist in a sports feed from a news outlet. Though, it should be appreciated that a stream of reports may be obtained from any suitable source and also may be in any suitable format. In this example, each of the reports is formatted to facilitate simplified processing. In this example, each of the reports 460A . . . 460E includes tags that identify the meaning of values within the report. Such reports may be generated using XML or other mark-up language. Though, the specific format is not critical to the invention and any suitable format may be used.

In this example, each of the reports 460A . . . 460E identifies information about an ongoing event. The tag "event stats" may be used as a designation that a report contains such information about an ongoing event. Other tags within the report may identify the type of information being provided. As a specific example, reports 460A, 460B, 460C and 460D include a tag "score" in report 460A. The score tag indicates that team X has a score of four and team Y has a score of two. Information in report 460B indicates that team A has a score of zero and team B has a score of zero. Similarly, information in report 460C indicates that team L has a score of zero and team M has a score of zero. Information report 460D indicates that player Q has a score of minus 6 and player R has a score of minus 5.

Other information about sporting events may also be included in the reports such that other information in reports 460A . . . 460E may be used to identify a status of an ongoing event. For example, report 460A indicates that the status of the event is "minute 52." Such a status may be appropriate for a soccer game. Report 460B indicates that the status of the event represented in report 460B is "minute two," which also may be appropriate for a soccer game. Similarly, the status within report 460C indicates that the event described by that report is in inning nine. Such a status may be appropriate for a baseball game. Report 460D indicates that a status for player Q is "hole four" but, that status for player R is "hole nine." Such status reports may be appropriate for a golfing match. Report 460E indicates that the status of the event described in that report is "lap 122." Such a status may be appropriate for a NASCAR race.

Such information may be used to determine values of recording parameters for a sports-related programming. For example, the status information contained in reports, such as reports 460A . . . 460E may be used, either alone or in combination with other information about an event, to determine an ending time of the event. This information may be used by control component 230 to determine a value of a recording parameter for a sporting event that controls the ending time of the recording. In particular, the information may be used to override ending times indicated for a sporting event in guide data 310.

As a specific example, a status of minute 52, as indicated in report 460A reveals that a soccer games has approximately 40 additional minutes of play time. If device 210 has been programmed to record that soccer game, control component 230, upon receiving a report such as report 460A, may check whether the value of recording parameters specified for recording that sporting event specify at least an additional 40 minutes of recording time. If not, control component 230 may adjust the value of recording parameters for that event.

Similar processing may be applied by control component 230 to determine whether the ending time for recording for other sporting events should be altered. For example, report 460C indicates the status of a baseball game is in the $9^{th}$ inning. The game may reach the $9^{th}$ inning near the scheduled ending time for a television presentation of the game. However, other sports data indicates that the score is tied in the $9^{th}$ inning. Because baseball games do not end in a tie, even though regulation play is ending, control component 230 may determine to alter the values of one or more recording parameters that specify ending time based on report 460C. Altering the values of the recording parameters may extend the recording time for the baseball game that is the subject of report 460C to ensure that the extra innings are recorded if they are played.

Accordingly, report 460C illustrates an example of how sports data indicating the status of sporting events may be used to override other recording parameters specified for sporting events. As another example, another status that may be presented in a report within stream 450 may be that the start of an event is delayed because of rain. In response to such a report, control component 230 may override a recording parameter that indicates a starting time for recording for a sporting event. The starting time may be delayed for an amount corresponding to the specified rain delay.

Accordingly, it should be appreciated that FIGS. 4A and 4B are simply illustrative of the types of sports data that may be used by a control component, such as control component 230. Sports data may include any suitable information that may be used to determine whether to record a sporting event, when to record that sporting event a channel on which to record the sporting event or the value of any other parameter associated with the recording of sporting events.

For example, sports data available to control component 230 need not be limited to data about ongoing or scheduled sporting events. Sports data may also provide control component 230 access to information about sports entities. Such information may be used for parsing reports, presenting user interfaces and/or interpreting user inputs. For example, data store 250 (FIG. 2) may be loaded with sports data identifying sports entities, such as sports leagues, teams within leagues or players on teams. Control component 230 may use this information to associate user inputs designating sporting entities with reports involving sporting events.

With such data available to control component 230, a user may provide an input indicating a desire to have recorded baseball games involving American League teams, for example. Control component 230 may access sports data indicating that team X is an American League team such that control component 230 can identify report 410, involving team X, as relating to a sports entity for which a user has expressed an intent to have recorded by requesting recording of events involving team X.

In a scenario in which sports data includes information about players, control component 230 may use sports data to generate user interfaces to receive user input and to appropriately respond to that user input relating to recording sports events involving specific players. Control component 230, for example, may use a list of American League baseball players to present a menu to a user, allowing the user to specify players. In response to such a specification of a player, control component 230 may access sports data, such as report 410, to identify sporting events involving or likely to involve the specified players.

As a specific example, a user may specify through such a user interface an intent to have sporting events involving player Z recorded. In response to such a user input, control component 230, upon receiving report 410, may determine that player Z is scheduled to appear in a sporting event that is to be presented at 8:00 by content provider ESPN. In combination with guide data 310, control component 230 can identify an appropriate time and channel to record a sporting event involving player Z.

Even if a report does not specifically identify player Z by name, control component 230 may nonetheless determine that a sporting event is to be recorded based on user input expressing an intent for sporting events involving player Z to be recorded. This result may be achieved, for example, by sports data stored in data store 250 (FIG. 2) indicating that player Z plays for team X. Accordingly, if control component 230 determines, based on sports data and/or guide data, that a sporting event involving team X is to be presented in television programming, control component 230 may record that television programming as a way to comply with the user's request to record sporting events including player Z.

Regardless of the specifics of the format or formats in which sports data is provided to device 210, device 210 may use this information to identify television programming presenting sporting events that align with user input expressing an intent to have sporting events recorded. The specific format of those interfaces is not critical to the invention. Though, in some embodiments, the interface components through which such user inputs are received may be incorporated into user interfaces through which inputs indicating conventional recording operations to be performed are received.

FIG. 5 provides an example of an interface through which user inputs identifying television programming related to sporting events to be recorded may be received. Such an interface may be generated by control component 230 or any other suitable component in device 210. In this example, the user interface is similar to those used in conventional digital video recording systems. FIG. 5 illustrates a graphical user interface 510, such as may be presented by device 210. Graphical user interface 510 includes a grid 520, illustrating programming available on different channels in different time slots. In this example, grid 520 may be generated based on guide data, as is known in the art.

To input a command for device 210 to record television programming, a user may manipulate a control, such as a cursor 530, to select a television program illustrated in the guide. In this example, the user has manipulated cursor 530 to select a program on channel 5, starting in the 5:00 p.m. time slot and extending into and past the 6:00 time slot.

Graphical user interface 510 may include control elements, of the type known in the art such that selection of a program brings up an information block 540. Here information block 540 provides additional information about a selected program. To specify recording of the selected program, a user may provide further input indicating a desire to record that program. Such input may be provided in any suitable way, such as by double-clicking on information block 540 or providing other suitable indication of a desire to specify recording information.

In response to such user input indicating a user intent to record television programming, control component 230 may present an interface through which the user may input commands to record the designated television programming. In this example, because the designated program involves a sporting event, the user interface presented may allow the user to designate sports entity information that control component 230 may use to select values of recording parameters so that recording of sporting events, in accordance with the user's intent, is achieved.

Figure 6:
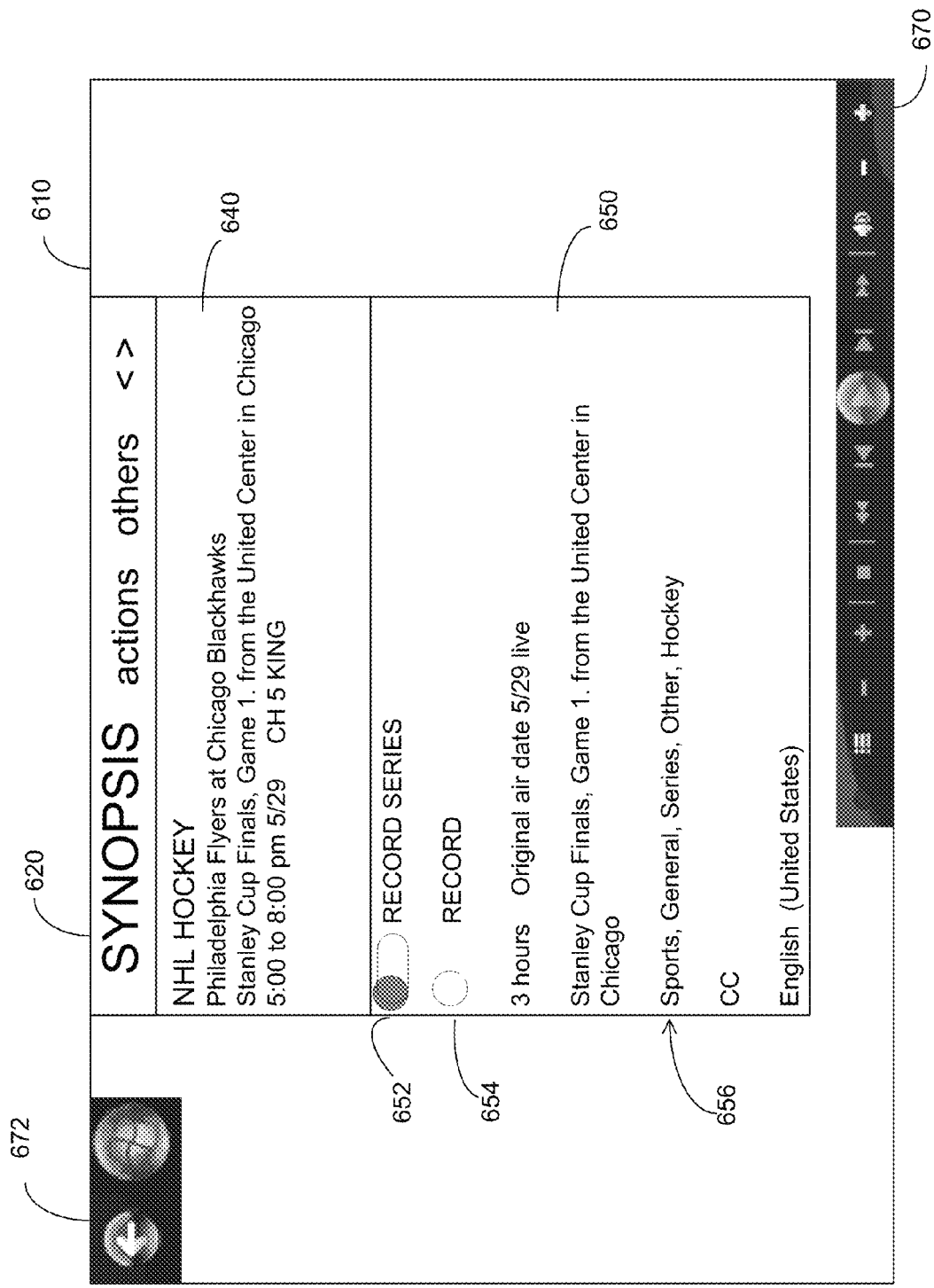
FIG. 6 is a sketch of a graphical user interface indicating inputs provided by a user to specify television programming about a sporting even to be reported.

FIG. 6 illustrates an example of a graphical user interface that may be presented to a user by computing device 210 in response to the user indicating a desire to record television programming involving a sporting event. Graphical user interface 610 includes multiple display areas through which device 210 may present information or receive user inputs concerning television programming to be recorded or otherwise processed.

In the example of FIG. 6, graphical user interface 610 includes an information block 640. Information block 640 provides information about a selected program, which in this example is the program selected through graphical user interface 510 (FIG. 5).

Menu bar 620 includes options, representing functions, that a user may select. In the state illustrated in FIG. 6, the user has selected the "synopsis" function. In response to selection of the synopsis function, device 210 presents in user interface 610 a synopsis of the television programming that has been selected and commands received in relation to recording that television programming. Accordingly, display area 650 provides a synopsis of the television programming identified in information block 640 and inputs received in connection with that television programming.

As configured in FIG. 6, display area 650 provides information about the selected program. The information presented may include information such as may be presented in a conventional digital video recorder. That information may, for example, include the scheduled time for presentation, the title of the event, whether it is closed captioned and a language in which it is presented as are illustrated in the Example of FIG. 6.

In addition, display area 650 may include information derived from sports data. In this example, such information appears on display line 656. The information on display line 656 indicates that the identified program is a sporting event. Display line 656 also indicates that the sporting event to be presented in the selected television programming is part of a series. In this example, the selected programming is Game One of the Stanley Cup Finals for NHL Hockey. In this case, control component 230 (FIG. 2) within device 210 has used sports data to identify that the indicated programming is part of a series that will include additional games that will be played at a later time. Display line 656 also indicates that the identified programming relates to hockey. Other information may alternatively or additionally be included on display line 656. As an example, the sporting event to be presented in the identified television programming may also be classified as "general" and "other." Though the specific meaning of each of these designations is not critical to the invention, the information may be used by control component 230 to determine that the indicated programming matches a category of sporting events about which a user has provided input expressing an intent for such programming to be recorded.

Display area 650 indicates controls that may be presented within user interface 610 to allow a user to input such intent. Because control component 230 has accessed sports data to determine that the sporting event to be presented during the identified television programming is part of a series, display area 650 may be configured to provide a user with multiple record options, including the option to record all of the games in the series. Control 652, for example, may be presented to allow a user to specify an intent for device 210 to record the entire series. In response to user activation of control 652, control component 230 (FIG. 2) may make entries into a recording schedule, such as may be maintained in data store 250, to record each of the games in the Stanley Cup Finals Series. Based on sports data, control component 230 may identify that there might be between 4 and 7 games in the Stanley Cup Finals Series, with the number of games actually played depending on the outcome of the games as they are played.

Accordingly, actually determining when and whether to record a sporting event may depend on subsequently received sports data. Once control component 230 has stored an indication to record the games, control component 230 may access sports data as it is generated to determine whether an when to record television programming presenting further games in the series without further user input. In this way, control component 230 may adjust to changes in the schedule of the games in the series to execute on the users intent to have all of the games played recorded.

Display area 650 may also include a control 654 that may allow the user to specify an intent to record the single game described in information block 640. Such a user interface control may be similar to a control as in a convention digital video recorder. Though, in this example, operation of control component 230 (FIG. 2) in response to user activation of record control 654 may be based on sports data. As illustrated in display area 650, the television programming is scheduled to air for three hours. In a conventional digital video recording system, selecting a record control would result in recording for three hours from the designated start time to the designated end time of the television programming. However, when control component 230 responds to a command to record the television programming identified in information block 640, control component 230 may access sports data to determine the appropriate times for recording, thereby overriding the guide data. For example, control component 230 may adjust the end time of recording to extend past the 8:00 time slot, if sports data available to control component 230 indicates that the game has not been completed or is likely not to be completed by 8:00. Control component 230, for example, may derive that information from reports, such as may be contained in a stream 450 as illustrated in FIG. 4B. Alternatively or additionally, control component 230 may use the sports data to adjust the start time for recording the programming identified in information block 640. A report, such as a report illustrated in FIG. 4A or FIG. 4B, may indicate that the game is reschedule or delayed for reasons that occurred after publication of the guide data used to generate user interface 510 and is therefore reflected in information block 640. In this way, sports data may be used to set recording parameters that lead to recording of television programming that better matches the user's intent.

Graphical user interface also may contain controls as are known in the art. For example, control 672 may be a navigation control, allowing a user to return to a previous user interface, such as user interface 510. Control tray 670 may also be present in graphical user interface 610. Control tray 670 may contain controls that allow a user to instruct device 210 to display recorded information. Such controls, for example, may initiate playback, fast forward, back-up or adjust the volume when a recorded program is played back.

In the state shown in FIG. 6, a user has selected the SYNOPSIS option from menu bar 620. When other functions are selected from menu bar 620, different or additional information may appear in display area 650 or elsewhere in graphical user interface 610. For example, if a user selects the "actions" function from menu bar 620, different information and/or controls may be presented in display area 650, including controls to archive or play recorded television programming or otherwise provide input for device 210 to take an action related to recorded programming. The actions that may be specified through graphical user interface 610 may, in some embodiments, include actions that may be specified for a conventional digital video recorder. Though, user interface 610 may include a mechanism for a user to specify any suitable action.

Similarly, selection of the "others" function from menu bar 620 may reconfigure the user interface 610 to present other information or receive other input. In addition, FIG. 6 illustrates that menu bar 620 includes navigation options, which may allow a user to reveal other functions that may be selected through menu bar 620. One such function may be adjusting recording settings upon selection of such a function.

Figure 7:
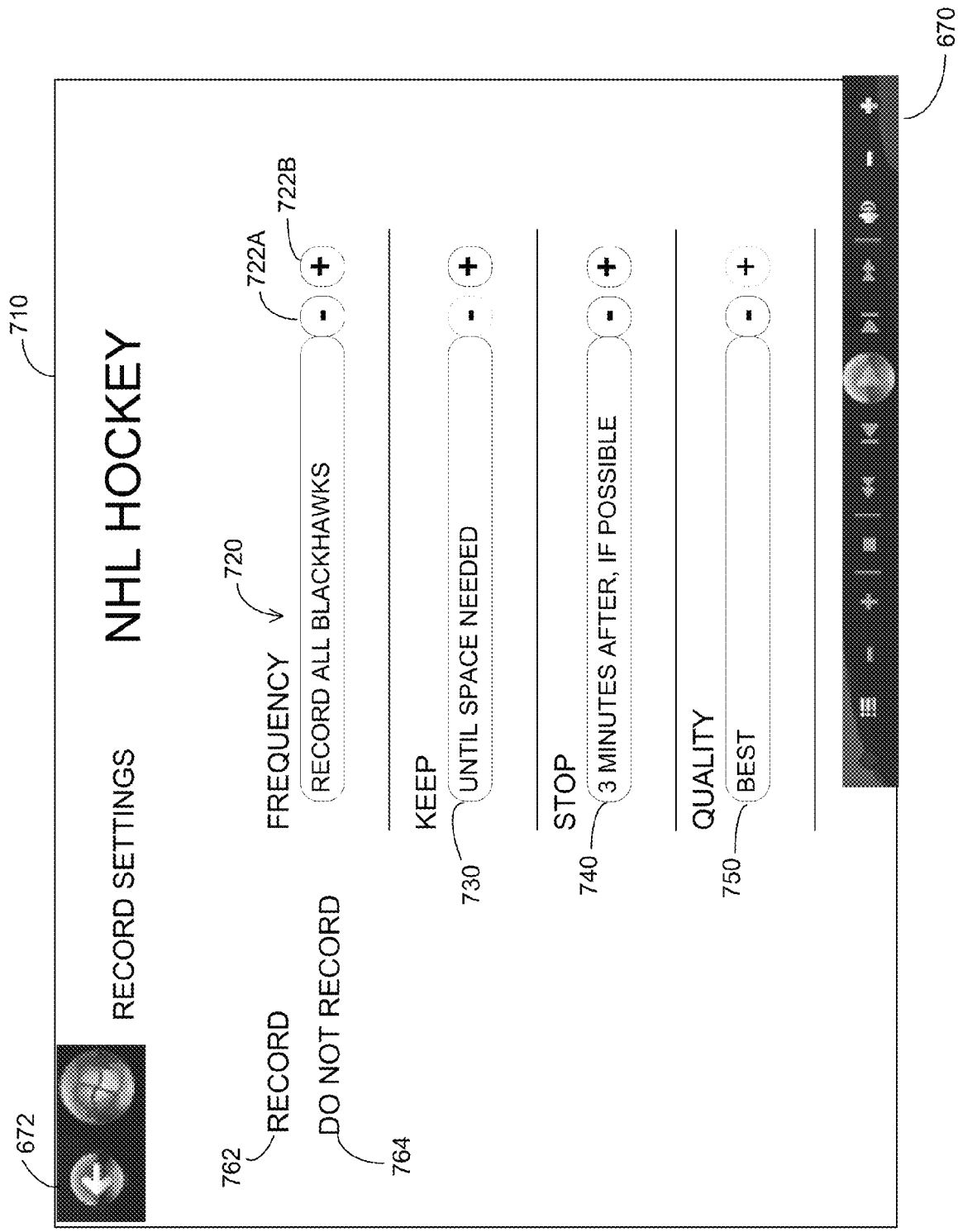
FIG. 7 is a sketch of a graphical user interface through which a user may specify television programming about a sporting event to be recorded.

In response to such a selection, device 210 may present a further graphical user interface through which a user may adjust recording settings for the program or series specified for recording through activation of control 652 or 654. FIG. 7 illustrates graphical user interface 710, which may be presented in response to user selection of a function on menu bar 620 indicating an intent to adjust recording settings.

Graphical user interface 710 may include control elements as are conventional in graphical user interfaces for digital video recording devices. Though, control elements in any suitable form may be included in graphical user interface 710. In this example, the control components are in the form of spinners. A spinner is a control that presents to a user choices one at a time from a list of options. The option presented in the spinner at any time may be controlled by user input. A selection may be made based on the choice that appears in the spinner when the user stops providing input to change it.

Taking spinner 720 as an example the spinner presents options for what is identified as "recording frequency." The options may allow a user, for example, to specify recording of a single event or television programming relating to multiple events. Those events may, as in the example of FIG. 6, be specified as a series. Though, other options for specifying a recording frequency are possible based on sports data, including data that identifies a sports entity such that a user may select to have recorded all sporting events that relate to a designated sports entity. Though, in the embodiment illustrated, the options based on sports entities that are presented through spinner 720 are limited to sports entities identified in information block 640. For example, the sporting event identified in information block 640 involves two teams, the Flyers and the Blackhawks. Accordingly, options for recording frequency made available to a user through spinner 720 may include recording future sporting events involving either team. In the scenario illustrated in FIG. 7, an option for recording games involving the Black Hawks has been indicated.

Regardless of the number of options that may be identified for recording frequency by control component 230, a user may select a desired recording frequency by activating controls 722A and 722B until a desired recording frequency is displayed in spinner 720. In this example, the spinner 720 moves through a list of options for recording frequency backwards as a user presses control 722A. The options presented in spinner 720 cycles through the list forwards as a user selects control 722B. Though, it should be appreciated that any suitable mechanism for manipulating and selecting options may be used.

Other spinners presented in graphical user interface 720 may present options of other recording settings that may be based on sports data or may be conventional. For example, spinner 740 presents options that may involve use of sports data. Through spinner 740, a user may specify a desired stop time for recording of the identified television programming. The options on stop time presented through spinner 740 may include stopping recording at a designated time based on guide data. Alternatively, as indicated in FIG. 7, spinner 740 may present an option for a dynamic stop time. In this example, a user has operated spinner 740 to select an option for stopping recording three minutes after control component 230 determines, based on the sports data, that the event being presented in the recorded television programming has ended.

Spinners 730 and 750 may represent controls as are conventional in a digital video recorder. For example, spinner 730 may allow a user to select an option for retaining the recorded television programming. Spinner 750 may allow a user to select a recording quality. Also, control 762 may allow a user to specify an intent for the identified programming to be recorded using the settings reflected in graphical user interface 710. Conversely, control 764 may allow a user to cancel a previously issued command to record television programming.

It should be appreciated that spinner 720 illustrates one mechanism by which a user may provide an input indicating an intent for device 210 to record television programming involving a sports entity. In the scenario illustrated in FIG. 7, the sports entity is a team. Such an input may trigger control component 230 to monitor sports data for sporting events involving that team. Upon detecting a sporting event involving a designated team, control component 230 may consult guide data or otherwise identify television programming presenting a sporting event involving that team.

Device 210 may present other user interfaces through which a user may designate other sports entities. For example, a user may provide input indicating sports entities such as leagues or players. In response to such a designation, control component 230 may monitor sports data to identify sporting events associated with the designated sports entities and initiate recording of those sporting events.

Figure 8:
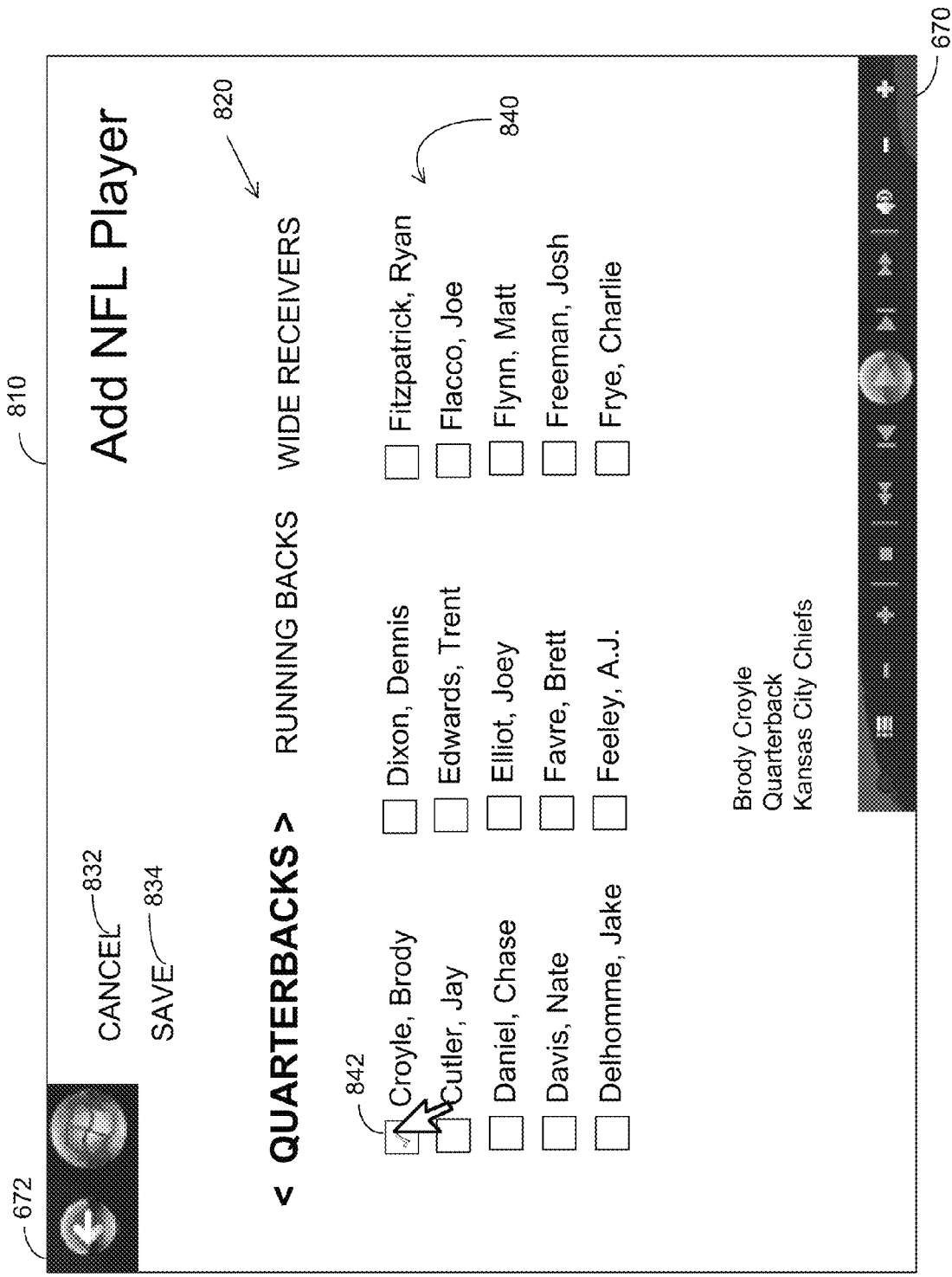
FIG. 8 is a conceptual illustration of a graphical user interface through which a user may identify players, which may be used to determine sporting events to be recorded.

FIG. 8 provides an example of a graphical user interface 810 through which a user may designate sports entities such that television programming containing sporting events involving the designated sports entity may be identified and recorded. In the example of FIG. 8, graphical user interface 810 allows a user to designate players as sports entities for which recording is to be performed. In the example of FIG. 8, a user has navigated through menu options to present the choices of FIG. 8. In this example, the user has navigated through options leading to user interface 810 through which the user may identify, as sports entities to use in determining recording parameters, a list of NFL players. Similar interfaces may be presented for players of other sports.

Other navigation controls may be presented to allow a user to navigate through groups of players. In this example, the players have been grouped by playing position. Through menu bar 820, a user to designate a playing position and view a group of players that sports data has indicated hold that position. In the example illustrated in FIG. 8, the user has designated playing position "quarterback." Accordingly, the list 840 presented in graphical user interface 810 contains a list of quarterbacks.

User interface 810 may include controls through which a user may select one or more of the players. In this example, the user has made a selection of player 842 through a checkbox. A checkbox is a type of control as is known in the art that may be used to receive user input through graphical user interface. Each of the players may be listed adjacent a check box, allowing a user to designate multiple players about which recording is to be performed.

Regardless of the number of players designated, once the user has identified players, the user may activate control 834 to save the selection. In response to user input indicating that selections of players should be saved, control component 230 may store indications of the designated players in data store 250 and may begin monitoring sports data to identify sporting events involving the designated players. If control component 230 identifies sporting events involving the designated players, control component 230 may identify television programming in which those sporting events are presented. When such television programming is identified, control component 230 may set recording parameters to cause that television programming to be recorded. Similar processing may be performed for other sports entities.

In some scenarios, a user may desire to have sporting events related to entities other than players be recorded. Graphical user interface 810, or any other suitable interface, may be used for this purpose. As one example, menu bar 820 may include an option to change the type of sports entities displayed for a user to select. Menu bar may contain an option for a user to view a list of sports teams, leagues or other entities. Though, any suitable navigation controls may be provided to enable a user to provide input identifying both a type of sports entity about which information is displayed and to make a specific selection of one or more sports entities based on the display.

Figure 9:
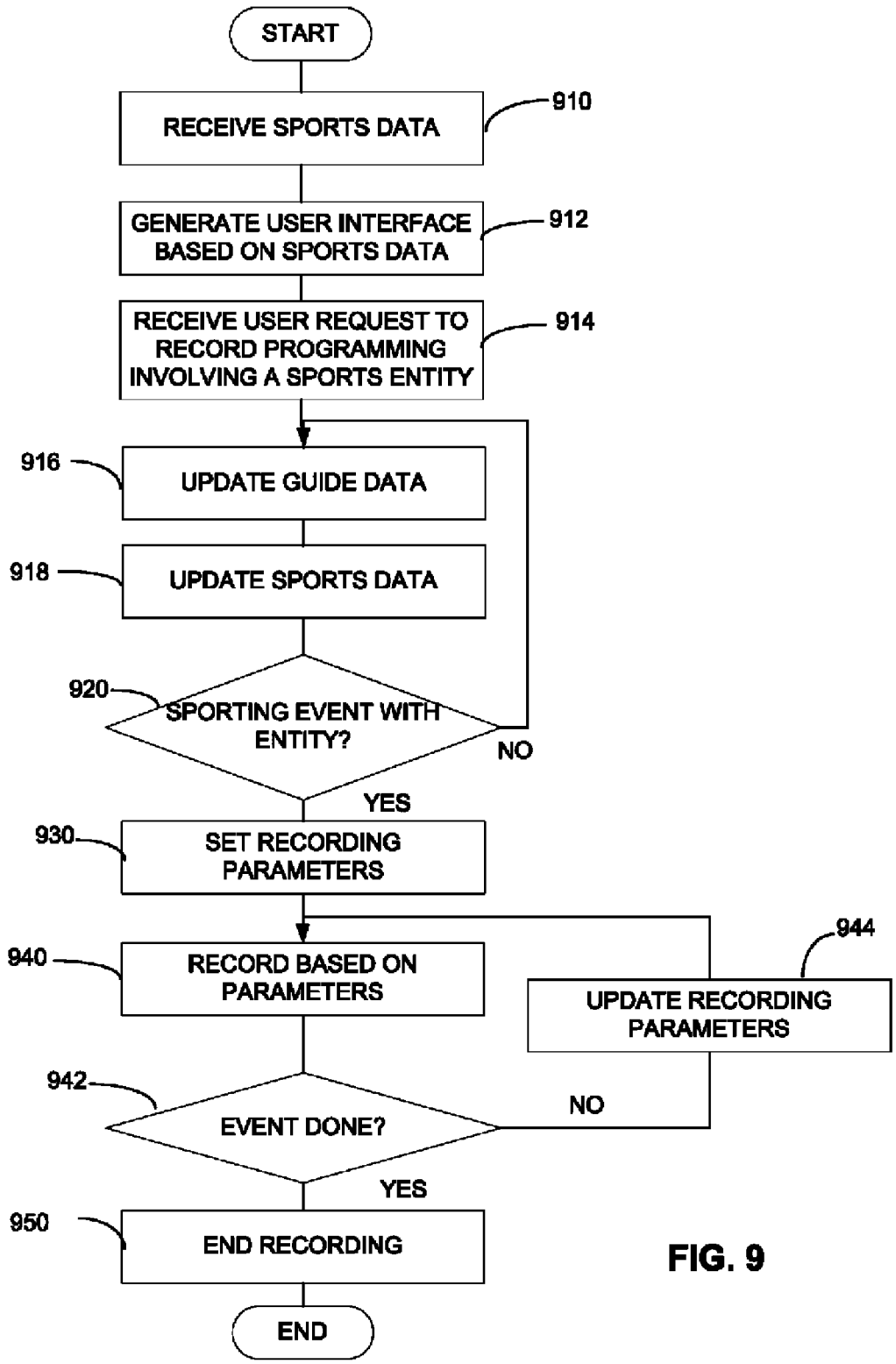
FIG. 9 is a flow chart of a method of operating a system for recording television programming relating to sporting events when a user has provided input identifying a sports entity.

FIG. 9 illustrates a process that may be performed, such as by control component 230 or other components within device 210, to record television programming involving sporting events. The process of FIG. 9 begins at block 910 where the device receives sports data. As describe above, sports data may include relatively static data about sports leagues, teams, players or other sports entities. The received sports data may also include information about duration of sports events or other information that may be used in generating user interfaces or selecting values of recording parameters for sporting events.

Initially, control component may use the sports data to generate user interfaces through which a user may provide input identifying sports entities about which television programming is to be recorded. At block 914, control component 230 may receive user input requesting the device record programming involving a sports entity. Such information may be received through a graphical user interface, such as is illustrated in FIG. 7 or 8, or in any other suitable way. In response to such input, control component 230 may store an indication of one or more entities about which sports programming is to be recorded. This information may be retained in data store 250 (FIG. 2) until canceled by a user or other criteria that may be specified are met.

Over the time period in which the information about a sports entity is retained and active, both guide data and sports data may change. Accordingly, at blocks 916 and 918 the device may update guide data and sports data, respectively. At decision block 920, control component 920 may check the updated sports data for a sporting event involving a designated sport entity. If, as a result of processing at block 920, no sporting event is identified, the process may loop back to blocks 916 and 918 where guide data and sports data may again be updated. This process may continue until a sporting event involving a designated sports entity is detected. Upon detection of such a sporting event, the process may branch from decision block 920 to block 930.

At block 930, control component 230 may set recording parameters to record the identified sporting event. The recording parameters may be based at least in part on fusing guide data and sports data such that a specific channel on which television programming presenting the sporting event is identified. The recording parameters set at block 930 may also include a start time and stop time for recording. Though, as noted above, either or both of the start and the stop time may be dynamically adjusted based on sports data indicating delays or rescheduling of the sporting event. Accordingly, processing at block 930 may include checking and, if appropriate, resetting the recording parameters based on updates to sports data that occurred after values of the recording parameters were set but before the specified time for starting the recording.

The process may then continue to block 940. At block 940, recording may begin based on the values of the recording parameters set at block 930. The process may then continue to decision block 942. At decision block 942, the process may branch, depending on whether the sporting event being recording is completed. As described above, completion of a sporting event may be determined based on sports data including reports of the status of the event. When the reports indicate that the event is not completed, or is not likely to be completed by the designated ending time, the process may branch to block 944. At block 944, the recording parameters may be updated. Updating the recording parameters at block 944 may include extending the ending time for recording based on sports data indicating the progress of the sporting event. Alternatively or additionally, values for other recording parameters may also be adjusted. For example, if a sporting event is being broadcast on multiple channels, but one channel will end its broadcast of the sporting event at a scheduled time, regardless of whether the event is completed, updating recording parameters at block 944 may include changing the value of a parameter designating the channel on which recording is performed.

Conversely, if processing at block 942 indicates that the event has been completed, the process may proceed to block 950. At block 950, the recording may end. Processing at block 950 may include any suitable processing, including storing digital information representing the recording programming, disabling a tuner, disabling data capture or other processing.

Figure 10:
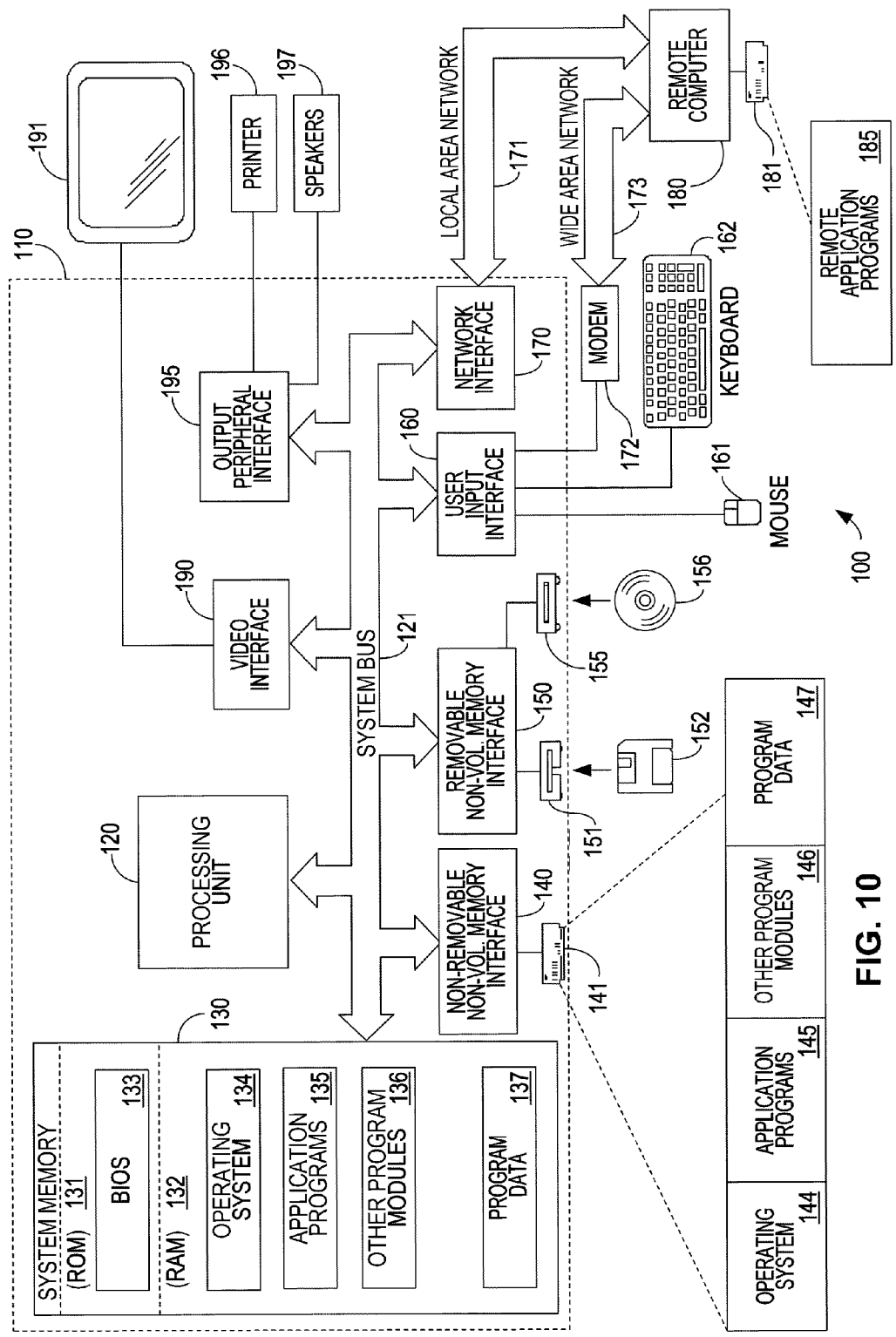
FIG. 10 is an architectural block diagram representative of computerized devices that may operate within the environment of FIG. 1.

FIG. 10 illustrates an example of a suitable computing system environment 100 in which embodiments of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10, provide storage of computer readable instructions, data structures, program modules and other data for the computer 110. In FIG. 10, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

As one example, guide data and sports data are shown coming from two different sources. It should be appreciated that guide data and sports data may be obtained from more or less than two sources. In some embodiments, guide data and sports data could be obtained from a single source. If the data is provided from a single source, the guide data and sports data may be fused by that source before the data is delivered to a client device, such as device 210. In such embodiments, sports data may be tagged with identifiers that indicate content providers, channels or other information that may allow a client device to establish recording parameters for a sporting event that user input indicates an intent to record.

Conversely, sports data or guide data may come from more than one source. For example, an electronic program guide may come from one source and a channel lineup may come from a different source. This information may be fused into guide data showing programming by channel for a specific location or media to which the channel lineup is applicable. Also, sports data may come from multiple sources. Obtaining sports data from different sources may provide more complete coverage of multiple types of sporting events.

Alternatively or additionally, different sources may provide different types of sports data. One source may provide relatively static sports data, such as a listing of available leagues or teams within leagues. Also, a source may provide data defining rules for parsing or applying sports data, such as rules that define the number of minutes in regulation play for a particular type of sporting event, the number of minutes in an overtime period, or the conditions under which an overtime period may be played. One or more other sources may provide more dynamic information, such as news reports about upcoming sporting events or status reports of events in progress.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Through, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a recording system, the method comprising:
    receiving user input identifying a sports entity;
    receiving sports data, the data relating the sports entity to a sporting event and independent of an electronic program guide, wherein the sports data comprises a plurality of tags and each tag identifies a type of information provided by the sports data; and
    selecting values of recording parameters based on the related sporting event and the electronic program guide.

2. The method of claim 1, wherein:
    receiving user information identifying a sports entity comprises receiving user input identifying a player; and
    selecting values of recording parameters comprises:
        determining, based on the received sports data, a sporting event in which the player is scheduled to appear; and
        selecting the parameters that specify recording television programming during which the related sporting event is presented.

3. The method of claim 2, wherein:
    receiving user information identifying a sports entity comprises receiving user input identifying a plurality of players; and
    the method further comprises prioritizing the plurality of players, wherein the identified player is a highest priority player.

4. The method of claim 3, further comprising:
    identifying at least one additional sporting event in which lower priority players, other than the highest priority player, is scheduled to appear; and
    selecting values of recording parameters based on the at least one additional sporting event and the electronic program guide.

5. The method of claim 1, wherein:
    the sports data indicates progress of the sporting event; and
    selecting values of the recording parameters comprises dynamically adjusting the values of the recording parameters based on the indicated progress of the sporting event.

6. The method of claim 5, wherein:
    the sporting event has a game clock;
    the sports data comprises a data feed including repeated indications of time remaining on the game clock; and
    dynamically adjusting the values of the recording parameters comprises adjusting a parameter the extends the scheduled ending time of the recording based on an indication of time remaining on the game clock.

7. The method of claim 1, wherein:
    receiving user information identifying a sports entity comprises receiving user input identifying a sports team; and
    selecting values of recording parameters comprises:
        determining based on the received sports data, a sporting event in which the sports team is scheduled to participate; and
        selecting the parameters that specify recording television programming during which the related sporting event is presented.

8. The method of claim 1, wherein:
    receiving user information identifying a sports entity comprises receiving user input identifying a league; and
    selecting values of recording parameters comprises:
        determining, based on the received sports data, a sporting event held by the league; and
        selecting the parameters that specify recording television programming during which the related sporting event is presented.

9. A television recording system, comprising:
    a user interface;
    a recording component;
    an input component adapted to receive a program guide and sports data, wherein the sports data comprises a plurality of tags and each tag identifies a type of information provided by the sports data, and the sports data is independent of the program guide;
    at least one processor for:
        receiving a designation of a sporting event through the user interface;
        merging the sports data and the program guide;
        based on the merged data, identifying values of recording parameters for controlling the recording component to record television programming displaying a sporting event involving the sports entity; and
        controlling the recording component based on the identified values of the recording parameters.

10. The system of claim 9, wherein:
    the processor is further for receiving a designation of a series of sporting events involving the sporting entity; and
    when the designation of the series of sporting events is received, the identified values of the recording parameters comprise values for controlling the recording component to record television programming presenting a plurality of sporting events involving the sports entity.

11. The system of claim 9, wherein:
    receiving the designation of the sporting event comprises receiving a designation of a sporting entity; and
    the processor is further for determining the sporting event by identifying from the sports data a sporting event involving the sporting entity.

12. The system of claim 9, wherein:
    the processor is further for presenting on the user interface a menu of user options for designating the sporting event, the user interface presenting a user to select from among a group of recording options, the group comprising recording a single game, recording a series of games and recording multiple games involving an sports team.

13. The system of claim 9, wherein:
    the processor is further for presenting on the user interface a menu for selecting a player; and
    receiving the designation of the sporting event comprises receiving a user selection of a player through the menu in conjunction with a command to record sporting events involving the selected player.

14. The system of claim 9, wherein:
    the processor is further for presenting on the user interface a menu for selecting a league; and
    receiving the designation of the sporting event comprises receiving a user selection of a league through the menu in conjunction with a command to record sporting events involving the selected league.

15. The system of claim 9, wherein:
    identifying values of recording parameters based on the merged data comprises determining status of the sporting event; and selectively extending the recording time when the determined status indicates that the sporting event will not be completed by an end time specified in values of the recording parameters.

16. A non-transitory computer readable storage medium comprising computer-executable instructions, that when executed by a processor, perform a method comprising:

receiving a feed of sports data, the sports data indicates progress of a sporting event and the sports data comprises a plurality of tags and each tag identifies a type of information provided by the sports data; and dynamically adjusting values of recording parameters for the sporting event based on the indicated progress of the sporting event.

17. The non-transitory computer readable storage medium of claim 16, wherein:

the sporting event is an automobile race; and the method further comprises extracting from the feed of sports data a lap count for the automobile race; and dynamically adjusting the values of the recording parameters comprises increasing a value of a parameter specifying a stop time for recording when the extracted lap count is below a threshold.

18. The non-transitory computer readable storage medium of claim 16, wherein:

the sporting event is a baseball game; and the method further comprises extracting from the feed of sports data an inning and a score for the baseball game; and dynamically adjusting the values of the recording parameters comprises increasing a value of a parameter specifying a stop time for recording when the extracted inning and score indicate that the game is not finished.

19. The non-transitory computer readable storage medium of claim 16, wherein the method further comprises:

receiving user input identifying a player; and identifying the sporting event based on scheduled participation of the player in the sporting event.

20. The non-transitory computer readable storage medium of claim 19, wherein the method further comprises:

storing recording parameters for each of a plurality of sporting events in which the identified player is scheduled to appear.

* * * * *